United States Patent
Wurst

(10) Patent No.: US 11,815,134 B2
(45) Date of Patent: Nov. 14, 2023

(54) ANTI-RATTLE FEATURE FOR CLUTCH PLATE

(71) Applicant: Schaeffler Technologies AG & Co. KG, Herzogenaurach (DE)

(72) Inventor: Nicholas Wurst, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/671,007

(22) Filed: Feb. 14, 2022

(65) Prior Publication Data
US 2023/0258235 A1   Aug. 17, 2023

(51) Int. Cl.
F16D 13/38   (2006.01)
F16D 13/58   (2006.01)

(52) U.S. Cl.
CPC ........... *F16D 13/385* (2013.01); *F16D 13/58* (2013.01)

(58) Field of Classification Search
CPC ........... F16D 13/38–69; F16D 25/0635; F16D 25/0638; F16D 2300/22
See application file for complete search history.

(56) References Cited

U.S. PATENT DOCUMENTS

| | | | | | |
|---|---|---|---|---|---|
| 3,446,323 | A | * | 5/1969 | Hilpert | F16D 25/0638 192/70.11 |
| 3,472,348 | A | * | 10/1969 | Hilpert | F16D 25/0638 192/70.23 |
| 3,482,668 | A | * | 12/1969 | Hilpert | F16D 25/0638 192/70.14 |
| 4,778,040 | A | * | 10/1988 | Kabayama | F16D 13/58 192/DIG. 1 |
| 5,964,329 | A | * | 10/1999 | Kawaguchi | F16H 45/02 192/3.3 |
| 11,560,941 | B1 | * | 1/2023 | Wurst | F16H 45/00 |
| 2018/0298957 | A1 | * | 10/2018 | Kauffeldt | F16D 25/12 |

* cited by examiner

*Primary Examiner* — David R Morris
(74) *Attorney, Agent, or Firm* — Volpe Koenig

(57) ABSTRACT

A drive assembly including a primary inertia plate and clutch. The primary inertia plate is configured to be rotationally driven via a crankshaft. The clutch plate includes a body with a rotational axis (X). The clutch plate is configured to be rotationally driven by the primary inertia plate. The clutch plate includes at least one imbalance feature such that a center of gravity of the clutch plate is positioned away from the rotational axis (X). The imbalance feature generates a centrifugal force that counteracts or prevents rattling from being imparted to the clutch plate via engine vibrations through the primary inertia plate.

20 Claims, 5 Drawing Sheets

ANTI-RATTLE FEATURE FOR CLUTCH PLATE

FIELD OF INVENTION

The present disclosure relates to an anti-rattle feature for a clutch plate.

BACKGROUND

Clutch plate and drive assemblies are well known. Clutch plates generally have a driving connection with a primary inertia plate or member. The primary inertia plate is connected to the crankshaft and therefore receives driving input from the engine.

Due to engine speed fluctuations and general operating conditions, the primary inertia plate generally experiences rattling, vibrations, or other movement that can be caused by piston motion in the engine. This vibration or rattling is then transmitted to the clutch plate due to the connection between the primary inertia plate and the clutch plate.

Accordingly, it would be desirable to provide an improved configuration for a clutch plate that avoids noise, vibration, harshness (NVH).

SUMMARY

A drive assembly including a primary inertia plate and clutch plate is disclosed herein. The primary inertia plate is configured to be rotationally driven via a crankshaft. The clutch plate includes a body with a rotational axis (X). The clutch plate is configured to be rotationally driven by the primary inertia plate. The clutch plate includes at least one imbalance feature such that a center of gravity of the clutch plate is positioned away from the rotational axis (X). The imbalance feature can be embodied as a modification in geometry of the clutch plate that alters its center of gravity.

The primary inertia plate can include at least one pocket, and the clutch plate can include at least one spline configured to be received within the at least one pocket. Various types of driving or lash connections can be provided between the primary inertia plate and the clutch plate.

The primary inertia plate can include at least one pocket, and the clutch plate can include at least one tab configured to be received within the at least one pocket.

The primary inertia plate can further include at least one flange within the at least one pocket, and the at least one flange is configured to engage with at least one tab. The at least one pocket can include a plurality of pockets, and the at least one tab can include a plurality of tabs.

The at least one imbalance feature can include at least one protrusion projecting from the body.

The at least one protrusion can be formed integrally with the body. The at least one protrusion can project radially outward from the body, or can project in another direction.

In one aspect, the at least one imbalance feature comprises at least one void in the body. The void can be formed as a through hole having a fully formed perimeter by the body of the clutch plate.

A clutch assembly can also be provided that includes the clutch plate, at least one friction plate, and a piston plate. The clutch plate is configured to be selectively rotationally driven by the primary inertia plate via either a direct friction connection or a lash connection.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
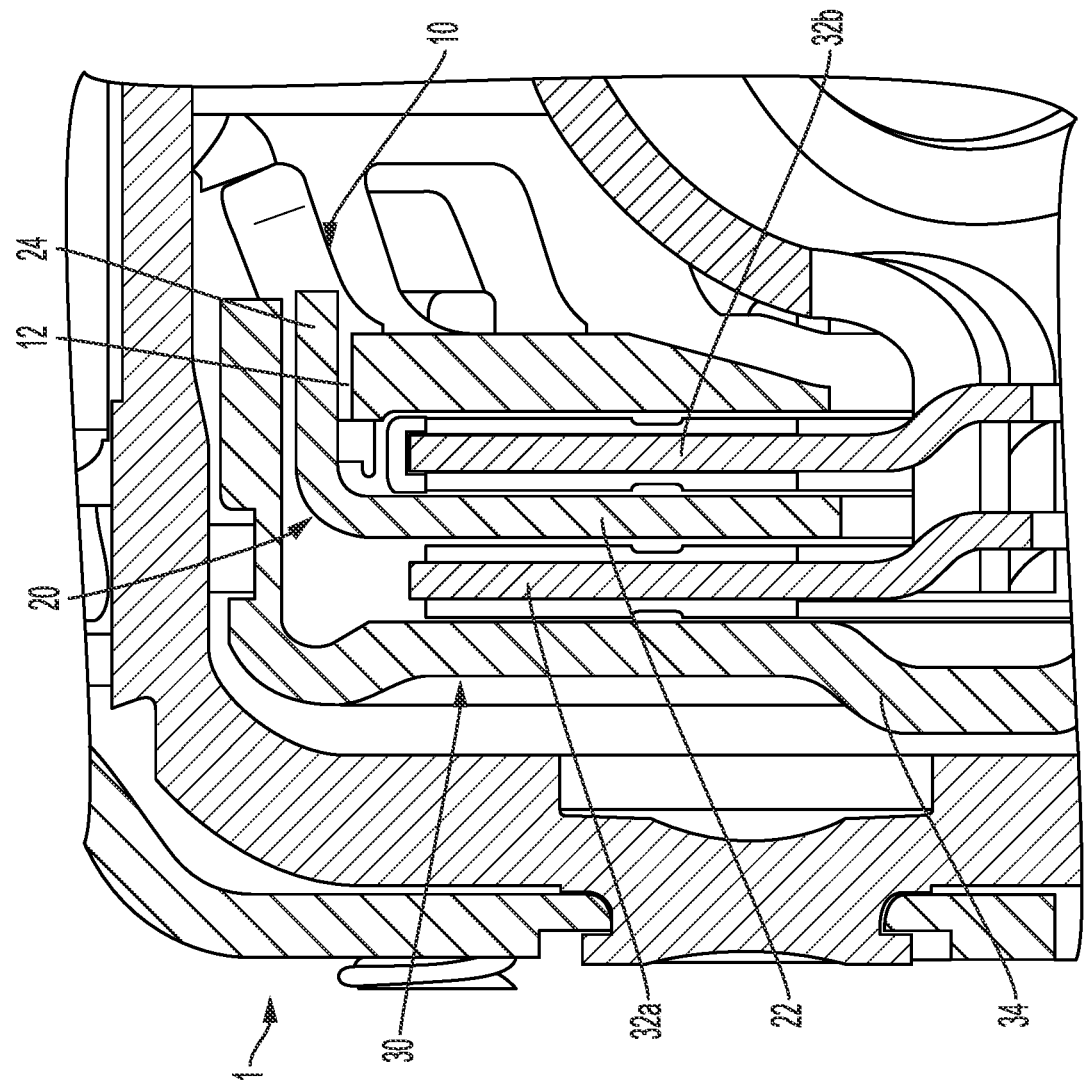
FIG. 1 is cross-sectional side view a drive assembly according to one aspect.

As shown in FIG. 1, a drive assembly 1 is generally disclosed herein. The drive assembly 1 includes a primary inertia plate 10 configured to be rotationally driven via a crankshaft (not shown). A clutch plate 20 is also provided that includes a body 22 with a rotational axis (X).

The clutch plate 20 is configured to be rotationally driven by the primary inertia plate 10. The clutch plate 20 is part of a clutch assembly 30 that also includes at least one friction plate 32a, 32b, and a piston plate 34. In one aspect, the clutch plate 20 is configured to be driven by the primary inertia plate 10 directly via a friction connection, or can be configured to be driven via a lash connection, as described in more detail herein. To be driven via a direct friction connection, the piston plate 34 is axially displaced to engage and compress with the friction plates 32a, 32b, and the clutch plate 20, such that these components are rotationally locked with the primary inertia plate 10. In the lash connection drive mode, the clutch assembly 30 is disengaged (i.e. open), and the clutch plate 20 is driven by the primary inertia plate 10 via a lash or other connection (such as a tab-pocket connection or other male-female connection with a gap). One of ordinary skill in the art would understand that various types of driving connections could be provided for the clutch plate 20 and the primary inertia plate 10.

Figure 5:
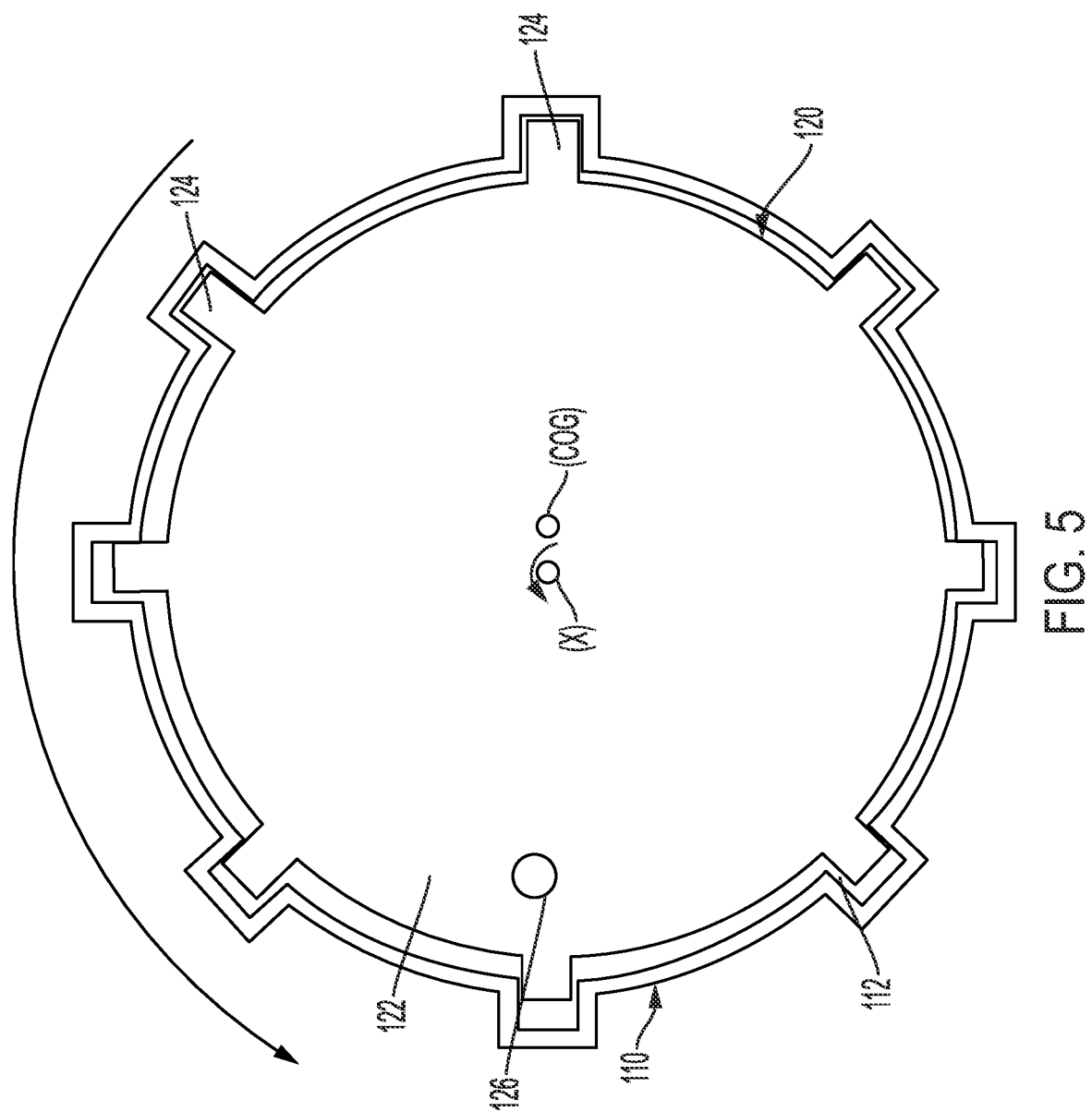
FIG. 5 is a schematic illustration of a clutch plate and a primary inertia plate interface according to one aspect.

The primary inertia plate 110 can include at least one pocket 112, and the clutch plate 120 can include at least one spline 124 configured to be received within the at least one pocket 112, as shown in FIG. 5. The spline connection between the primary inertia plate 110 and the clutch plate 120 can be configured as a toothed engagement, in one aspect. Various other types of non-circular splined or toothed connections can be provided between the primary inertia plate 110 and the clutch plate 120.

The primary inertia plate 10 can include at least one pocket 12, and the clutch plate 20 can include at least one tab 24 configured to be received within the at least one pocket 12 as shown in FIGS. 1-3A. The at least one pocket 12 can include a plurality of pockets 12, and the at least one tab 24 can include a plurality of tabs 24, in one aspect. In one aspect, the plurality of pockets 12 are defined along a radially outer region of the primary inertia plate 10 and the plurality of tabs 24 are defined along a radially outer region of the clutch plate 20. The plurality of tabs 24 are generally formed as axially extending flanges, in one aspect. One of ordinary skill in the art would understand that the quantity of pockets and tabs can vary depending on the particular requirements of a design. Additionally, the geometry or profile of the pockets and tabs can vary.

Figure 2:
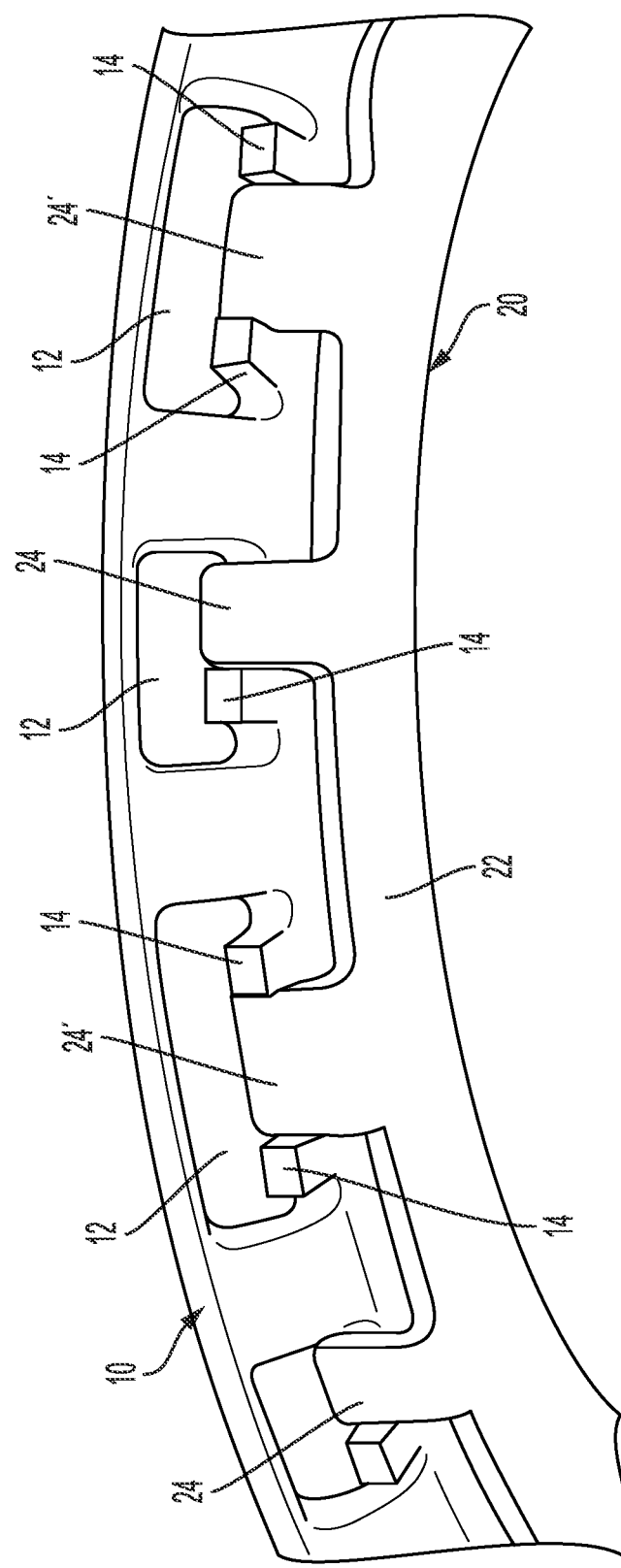
FIG. 2 is a top perspective view of an interface between a clutch plate and a primary inertia plate from FIG. 1.

As shown in FIG. 2, two of the tabs 24' are relatively larger than the other tabs 24. This increase in size, which correlates to an increase in mass, causes the center of gravity to be shifted. While the tabs 24' are illustrated as being wider in FIG. 2, one of ordinary skill in the art would understand that the length of these tabs could also be increased relative to the other tabs, which also would cause a shift in the center of gravity and a resulting imbalance force.

Figure 3A:
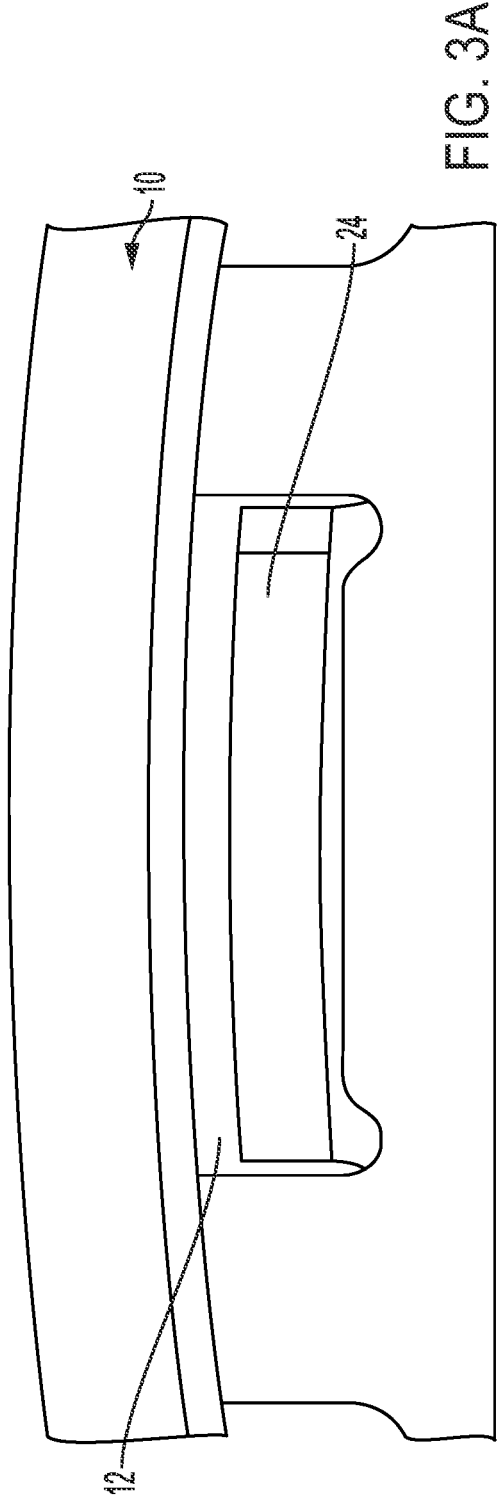
FIG. 3A is a magnified view of a pocket-tab interface between the clutch plate and the primary inertia plate from FIG. 1.
Figure 3B:
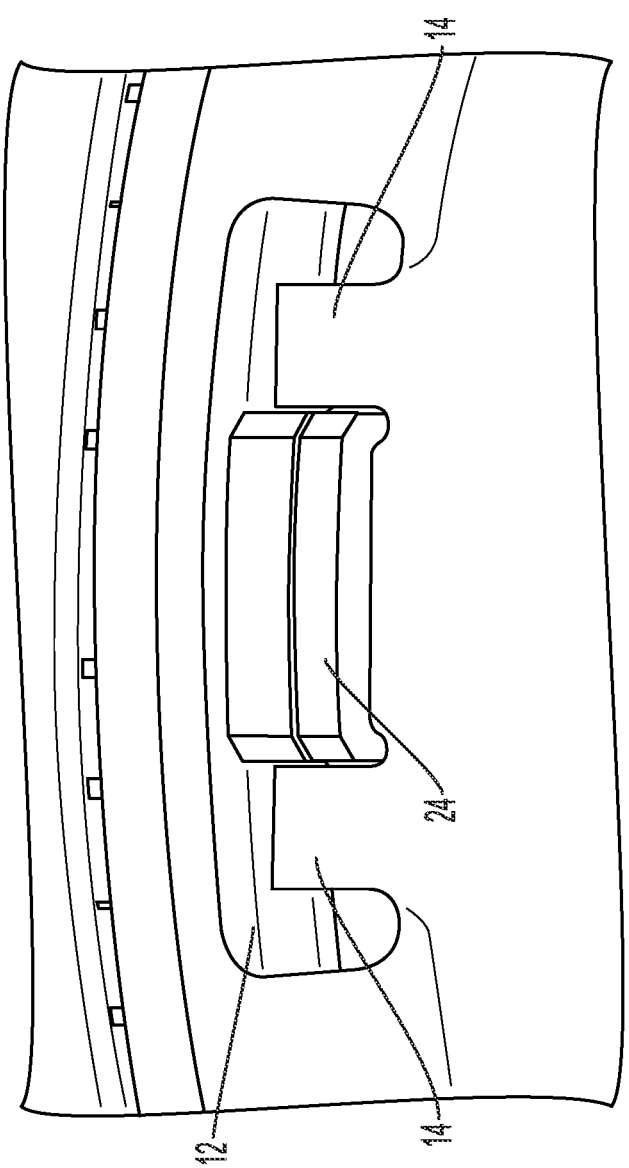
FIG. 3B is a magnified view of another pocket-tab interface.

As shown in FIG. 3B, the primary inertia plate 10 can further include at least one flange 14 within the at least one pocket 12, and the at least one flange 14 can be configured to engage with at least one tab 24. Flanges can be provided on one or both of the circumferential or peripheral areas of the pockets 12 and can be configured to provide engagement elements or abutments for engagement with the tabs 24. In another aspect, the tabs 24 can engage directly against a perimeter surface of the pockets 12, and the flanges can be omitted.

Figure 4:
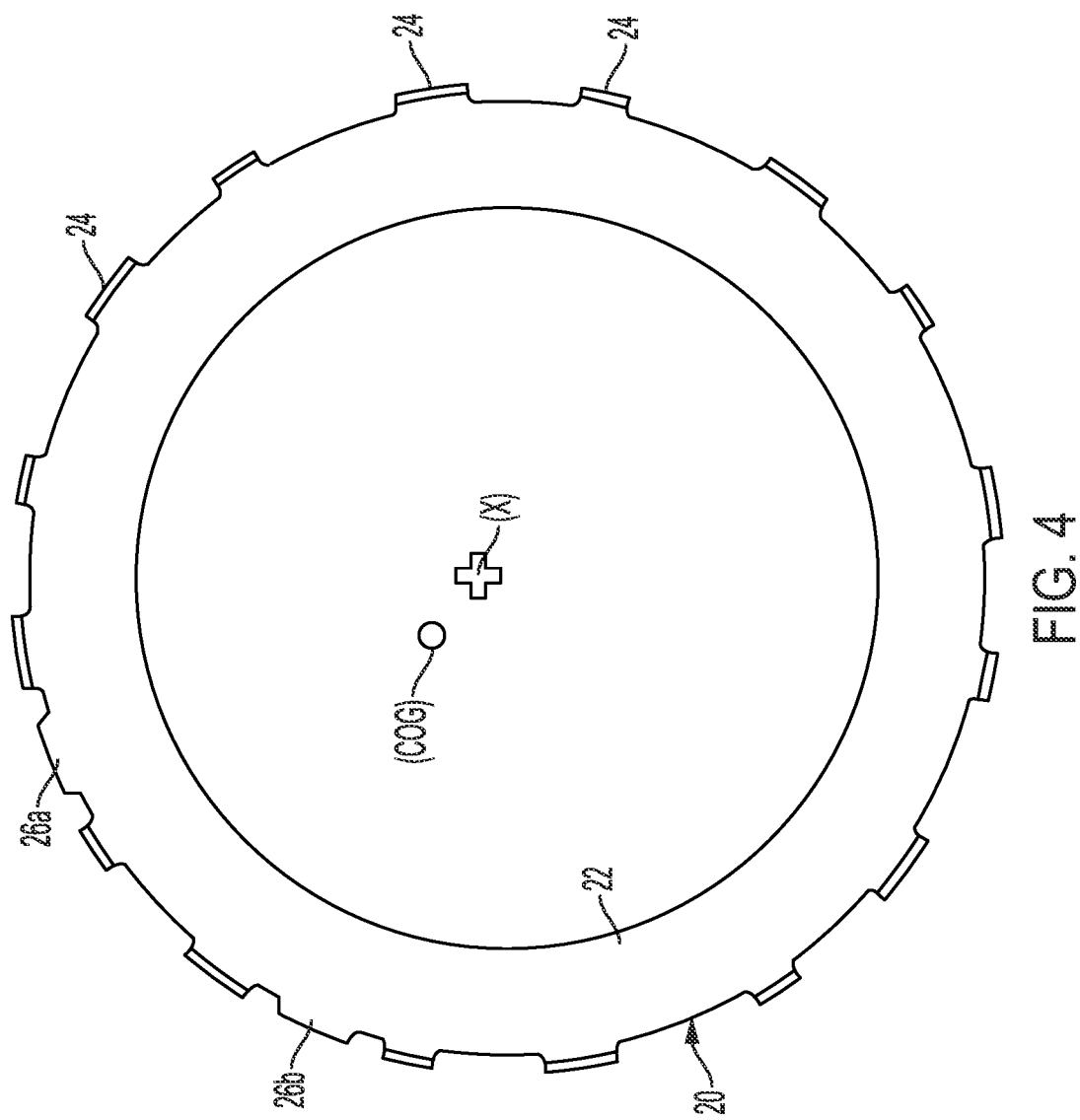
FIG. 4 is a front view along an axial direction of the clutch plate of FIG. 1.

The clutch plate 20 includes at least one imbalance feature such that a center of gravity (COG) of the clutch plate 20 is positioned away from the rotational axis (X). This aspect is shown schematically in FIG. 5. One of ordinary skill in the art would recognize from this disclosure that adjusting the position of the COG of the clutch plate 20 can be achieved in a variety of manners. For example, in one aspect, the imbalance feature comprises at least one protrusion 26a, 26b extending from or otherwise formed with the body 22, as shown in FIG. 4. The at least one protrusion 26a, 26b can be formed integrally with body 22, in one aspect. The at least one protrusion 26a, 26b projects radially outward from the body 22, in one aspect. In one aspect, the protrusion 26a, 26b extends only in the radial direction. The protrusion 26a, 26b can be defined in a circumferential area between tabs 24. As shown in FIG. 4, at least two protrusions 26a, 26b can be provided. The protrusions 26a, 26b have a predetermined mass and based on this increase of mass in the body 22, the COG is displaced in a direction towards the protrusions 26a, 26b relative to the rotational axis (X). One of ordinary skill in the art would understand that the protrusion can alternatively project in a radial inward direction, axial direction, or any other direction.

The imbalance feature can comprise at least one void 126 in the body 122, as shown in FIG. 5. The void 126 can be formed as a through opening, indentation, or recess on the clutch plate 120. The void 126 can be defined on the clutch plate 120 in an area or location away from the portion of the clutch plate 120 that engages with the primary inertia plate 110. As shown in FIG. 5, the COG is displaced relative to the rotation axis (X) in a direction away from the void 126. The void 126 can be defined in an area radially inward from the interface portion of the clutch plate configured to engage with the primary inertia plate.

The imbalance features disclosed herein can be formed integrally with the clutch plate, which simplifies assembly due to reduction in complexity or installing additional damping or rattle-preventing elements.

The imbalance features disclosed herein generally causes the center of gravity to shift or be displaced away from the rotational axis (X) of the clutch plate. By shifting the center of gravity, a centrifugal force is generated on the clutch plate that causes the clutch plate to bias or fling radially outward while rotating or spinning. This centrifugal force causes a contact force to be generated between the interface elements (i.e. tabs, pockets, splines, flanges, etc.) formed on the clutch plate and primary inertia plate. Based on the characteristics of the imbalance feature, this centrifugal force can be determined or designed to overcome the force generated due to engine fluctuations, which are otherwise transmitted from the crankshaft to the primary inertia plate and the clutch plate. The centrifugal force generated due to the imbalance feature can be configured to prevent rattling of the clutch plate by overcoming the vibrational or rattling forces imparted by the crankshaft.

Various relationships and equations can be provided for determining the appropriate balancing force to counteract the rattling force imparted by the primary inertia plate to the clutch plate. These relationships and equations generally are based on variables that analyze the requisite force necessary to counteract the rattle force, and may include adjusting the mass of the clutch plate in various ways, including but not limited to adjusting the size of the tabs, adding protrusions, removing material, etc.

Although tabs or splines are shown on the clutch plate and pockets are shown on the primary inertia plate, one of ordinary skill in the art would understand this arrangement can be reversed.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Drive Assembly 1
Primary Inertia Plate 10, 110
Pockets 12, 112
Flanges 14
Clutch Plate 20, 120
Body 22, 122
Tabs 24
Imbalance Feature 26, 126
Clutch Assembly 30
Friction plates 32a, 32b
Piston Plate 34
Spline 124

What is claimed is:

1. A drive assembly comprising:
   a primary inertia plate configured to be rotationally driven via a crankshaft; and
   a clutch plate including a body with a rotational axis (X), the clutch plate being configured to be rotationally driven by the primary inertia plate, wherein the clutch plate includes at least one imbalance feature such that a center of gravity of the clutch plate is displaced from the rotational axis (X);
   wherein the primary inertia plate includes at least one pocket, and the clutch plate includes at least one tab configured to be received within the at least one pocket;
   wherein the primary inertia plate further includes at least one flange within the at least one pocket, wherein the at least one flange is configured to engage with at least one tab; and
   wherein the at least one flange extends axially from the primary inertia plate and is spaced from circumferential sides of the pocket.

2. The drive assembly according to claim 1, wherein the at least one tab includes a plurality of tabs, and a first tab of the plurality of tabs is larger than a second tab of the plurality of tabs, and the first tab is the at least one imbalance feature.

3. The drive assembly according to claim 1, wherein the at least one pocket includes a plurality of pockets, and the at least one tab includes a plurality of tabs.

4. The drive assembly according to claim 1, wherein the at least one imbalance feature comprises at least one protrusion projecting from the body.

5. The drive assembly according to claim 4, wherein the at least one protrusion is formed integrally with the body.

6. The drive assembly according to claim 4, wherein the at least one protrusion projects radially outward from the body.

7. The drive assembly according to claim 1, wherein the at least one imbalance feature comprises at least one void formed in the body.

8. The drive assembly according to claim 1, further comprising a clutch assembly including at least one friction plate, and a piston plate, and the clutch plate is configured to be rotationally driven by the primary inertia plate via a direct friction connection or a lash connection.

9. The drive assembly according to claim 1, wherein the imbalance feature generates a contact force at an interface of the primary inertia plate and the clutch face that exceeds rattling forces imparted by the crankshaft on the primary inertia plate.

10. A drive assembly comprising:
    a primary inertia plate; and
    a clutch plate, wherein a lash connection is provided between the primary inertia plate and the clutch plate, and the clutch plate includes at least one imbalance feature configured to displace a center of gravity of the clutch plate away from a rotational axis (X) of the clutch plate;
    wherein the primary inertia plate includes at least one pocket, and the clutch plate includes at least one tab configured to be received within the at least one pocket;
    wherein the primary inertia plate further includes at least one flange within the at least one pocket, wherein the at least one flange is configured to engage with at least one tab; and
    wherein the at least one flange extends axially from the primary inertia plate and is spaced from circumferential sides of the pocket.

11. The drive assembly according to claim 10, wherein the at least one imbalance feature is integrally formed with the clutch plate.

12. The drive assembly according to claim 10, wherein the at least one imbalance feature comprises at least one protrusion that projects from the clutch plate.

13. The drive assembly according to claim 12, wherein the at least one protrusion projects radially outward from the clutch plate.

14. The drive assembly according to claim 10, wherein the imbalance feature comprises at least one void in the clutch plate.

15. The drive assembly according to claim 10, wherein the imbalance feature generates a contact force at an interface of the primary inertia plate and the clutch face that exceeds rattling forces imparted by a crankshaft on the primary inertia plate.

16. A drive assembly 1 comprising:
    a primary inertia plate configured to be rotationally driven via a crankshaft, the primary inertia plate including a plurality of pockets along a radially outer region of the primary inertia plate; and
    a clutch plate including a body comprising a plurality of tabs extending therefrom, the plurality of tabs being configured to engage within respective pockets among the plurality of pockets to provide a lash connection between the primary inertia plate and the clutch plate,
    wherein the clutch plate includes at least one imbalance feature defined in a region away from the plurality of tabs, and the at least one imbalance feature is configured to displace a center of gravity of the clutch plate away from a rotational axis (X) of the clutch plate;
    wherein the primary inertia plate further includes at least one flange within at least one of the plurality of pockets, wherein the at least one flange is configured to engage with at least one of the plurality of tabs; and
    wherein the at least one flange extends axially from the primary inertia plate and is spaced from circumferential sides of the pocket.

17. The drive assembly according to claim 16, wherein the at least one imbalance feature includes a protrusion extending in a radial direction and circumferentially arranged between the plurality of tabs.

18. The drive assembly according to claim 16, wherein the at least one imbalance feature includes a void defined in a region radially inward from radially outer periphery of the clutch plate.

19. The drive assembly according to claim 16, wherein the at least one imbalance feature is formed integrally with the clutch plate.

20. The drive assembly according to claim 16, wherein the imbalance feature generates a contact force at an interface of the primary inertia plate and the clutch face that exceeds rattling forces imparted by the crankshaft on the primary inertia plate.

* * * * *